Jan. 14, 1947.　　　D. E. KENYON　　　2,414,107
ELECTRONIC TIMING APPARATUS
Filed June 30, 1944　　　3 Sheets-Sheet 1
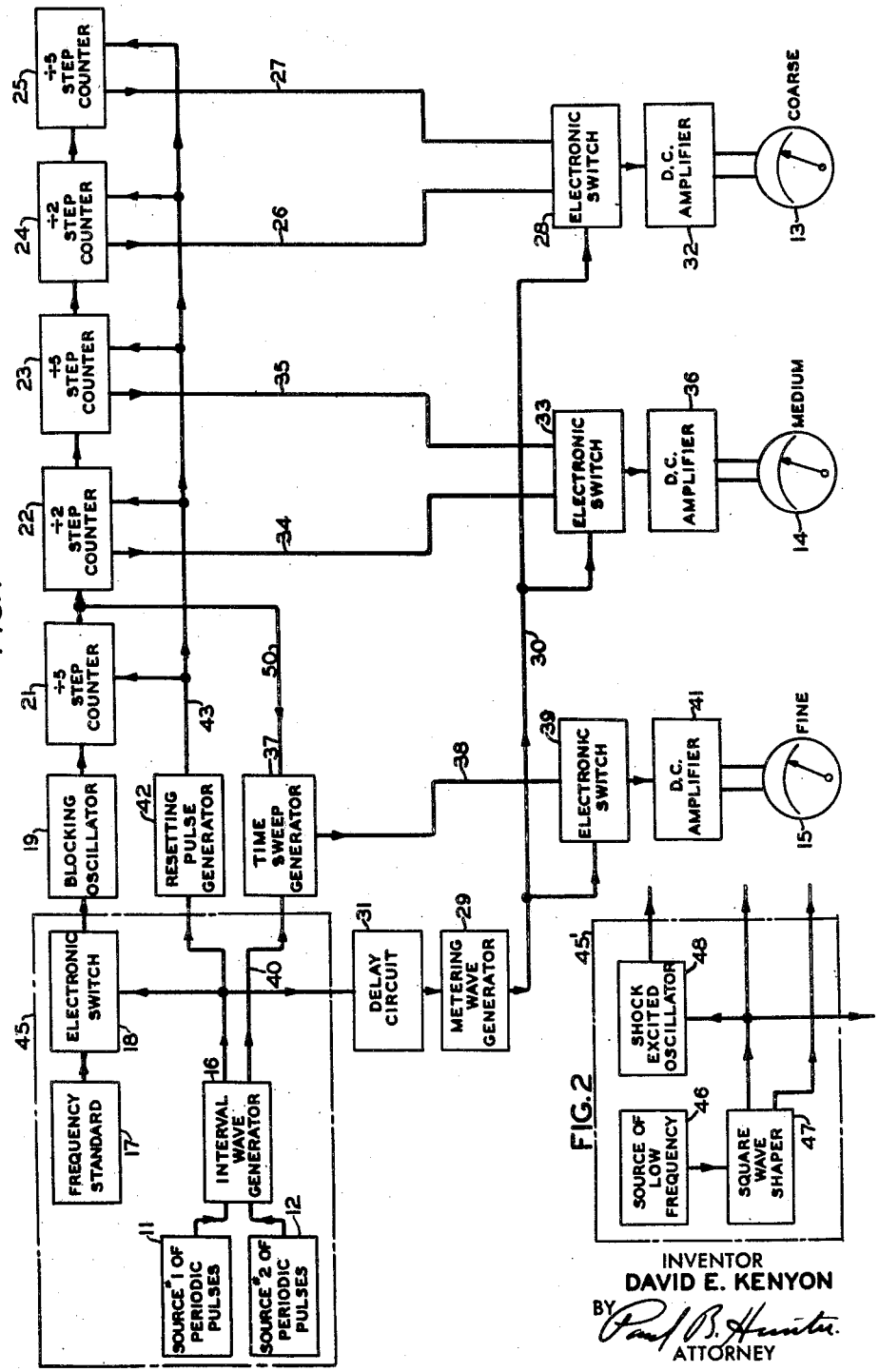
INVENTOR
DAVID E. KENYON
BY
Paul B. Hunter
ATTORNEY

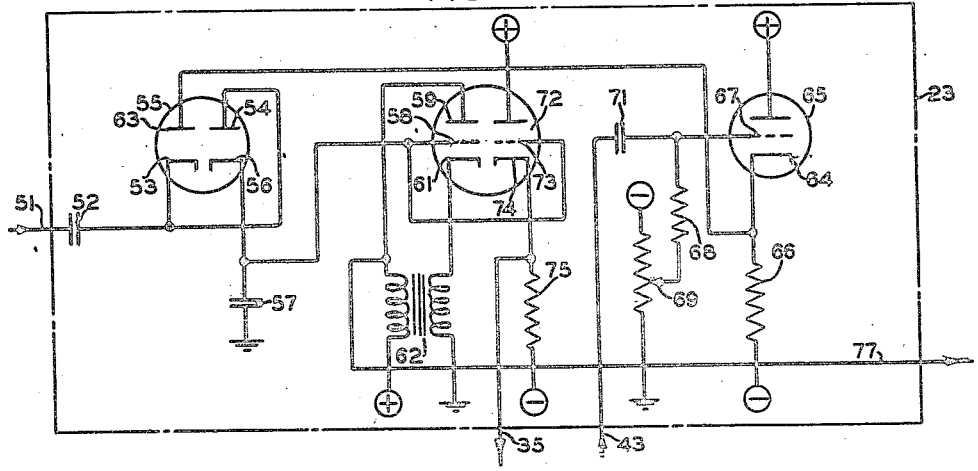
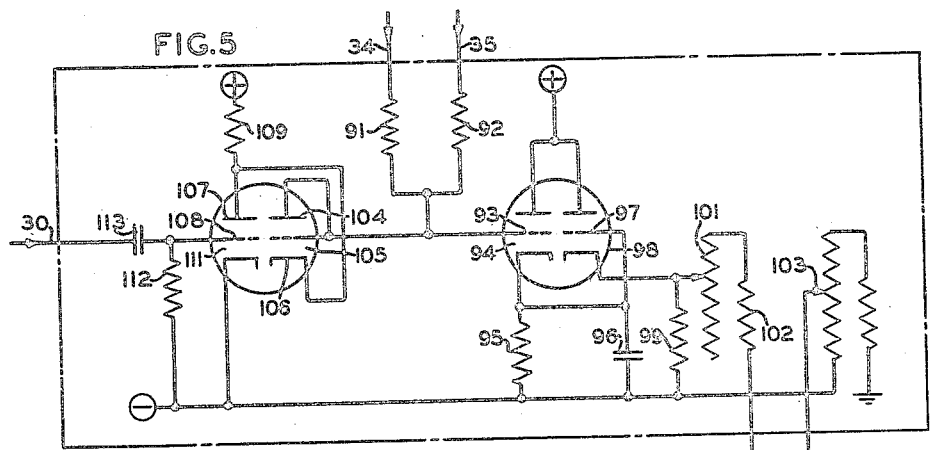
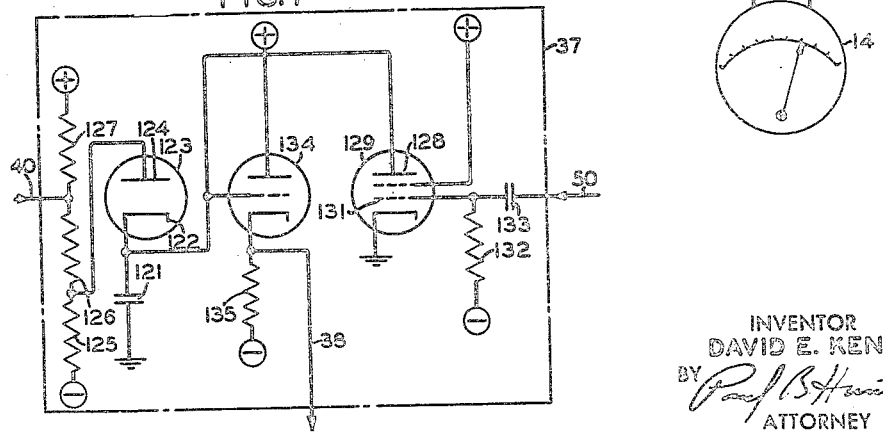

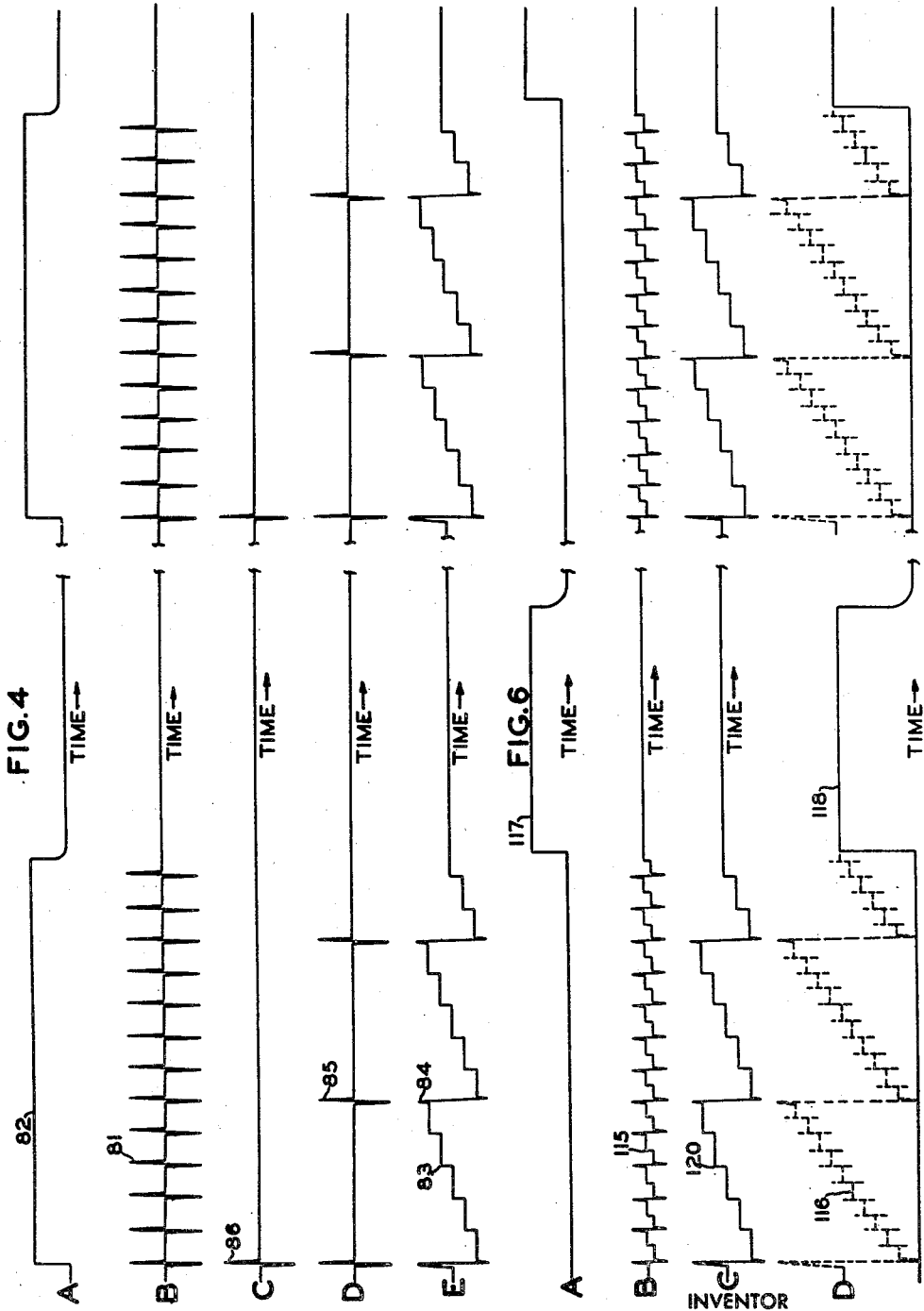

Patented Jan. 14, 1947

2,414,107

UNITED STATES PATENT OFFICE 2,414,107

ELECTRONIC TIMING APPARATUS

David E. Kenyon, Smithtown, N. Y., assignor to Sperry Gyroscope Company, Inc., a corporation of New York Application June 30, 1944, Serial No. 543,034

16 Claims. (Cl. 161—15)

The present invention relates to counting and timing devices, and concerns particularly electronic means for the precise measurement and continuous indication of recurrent time intervals.

The employment of electron tubes to control the charging or discharging of a capacitor and the subsequent measurement of the change in potential across the capacitor as a function of the elapsed time of current flow is a common method of determining a time interval. Although very short intervals may be measured in this manner, the accuracy of a direct reading instrument in terms of the useable fraction of full scale indication is limited to perhaps one percent by the galvanometer employed in the vacuum tube voltmeter which measures the potential left on the capacitor.

The prior art also teaches the measurement of time by counting pulses derived from a standard frequency source, such as the domestic alternating current supply, and the utilization of trigger circuits which "scale down" or divide the rate of occurrence of the impressed pulses to make possible their summation by relatively slow acting electromechanical counters. Devices operating on this principle are well adapted to measure accurately long time intervals, but they are not suited for indicating the length of recurrent short periods with precision.

It is, therefore, an object of the present invention to provide means for measuring a recurrent time interval by counting the number of pulses of a precisely known frequency contained within the unknown interval, the total count being proportioned among a plurality of indicating meters for the purpose of providing a reading many times more accurate than the accuracies of the individual meters.

Another object is to provide an electronic interval meter having charge collecting capacitors which are placed at a reference potential by a pulse generated in response to the commencement of the recurrent time interval that is to be measured and indicating means which are responsive to the potentials on the capacitors only after the conclusion of this interval for indicating the average length thereof.

A further object is to provide recurrent interval measuring means adapted to furnish a continuous indication proportional to the potential appearing across a charge collecting capacitor at the termination of the charging interval and sampled for such a short period thereafter as to provide a reading substantially free from errors caused by spurious current leakage into or out of the charge-collecting capacitor.

Still another object of the present invention lies in the provision of novel time sweep generating means synchronized by those pulses of stable frequency which are employed to measure a periodic interval in terms of the number generated during the same, the sweep generating means permitting interpolation between the individual pulses whose sum defines the interval and thereby affording an interval measurement of increased accuracy.

Other objects and advantages of the invention will become more apparent in connection with the following detailed description of the illustrated embodiment thereof, together with the accompanying drawings, wherein:

Fig. 1 is a block diagram of a recurrent interval measuring system embodying the present invention;

Fig. 2 is a block diagram of a circuit which may be substituted for that portion of Fig. 1 indicated by dash lines 45 to adapt the structure of the latter figure to the measurement of low frequencies;

Fig. 3 is a schematic diagram of a typical step counter employed in the structure of Fig. 1;

Figs. 4A–4E are graphs of wave shapes illustrating the operation of the step counter shown in Fig. 3;

Fig. 5 is a schematic diagram of an electronic switch and indicating circuit employed in the structure of Fig. 1;

Figs. 6A–6D are graphs of wave shapes illustrating the operation of the electronic switch and indicating circuit shown in Fig. 5; and Fig. 7 is a schematic diagram of a time sweep generator employed in the structure of Fig. 1 to provide a fine scale indication.

Similar reference characters are employed in all the above figures to designate corresponding parts and arrows are provided to indicate the direction of energy flow.

In its essential function, the electronic apparatus hereinafter disclosed measures a recurrent time interval. This interval may be that between any two periodic events having substantially the same repetition rate no matter what their origin if they are capable of initiating electrical impulses. Thus, if the events are the occurrences of corresponding portions of different waves having the same predetermined frequency, then the present apparatus may, if desired, indicate the length of the recurrent interval between such wave portions in terms of relative phase angle.

On the other hand, if the present device responds to similar portions of the same wave, then the indicating scales may be calibrated in terms of the frequency of the measured wave. This interval between the two periodic events is embodied in a control wave having a length precisely equal to the interval to be measured. The control wave causes impulses of a stable frequency to be applied to an impulse counting circuit.

This counting circuit comprises a series of charge collecting capacitors interconnected by blocking oscillators and adapted to be charged in steps by applied impulses. Each of the oscillators is arranged to be triggered by a critical potential placed on the preceding capacitor corresponding to a predetermined number of impulses for the purpose of discharging this capacitor and for concurrently supplying a charging impulse to the succeeding capacitor. This charging and discharging action continues as long as the control wave permits the pulses to be applied to the counter chain. Upon the conclusion of the interval, however, the momentary charge on each capacitor in the series remains substantially unchanged until the beginning of the next interval. These charges reveal the electrical position of the counter and the residual potential on each capacitor is a measure of the number of impulses applied thereto in excess of an integral multiple, including zero, of the predetermined number necessary to cause a discharge of the capacitor through its associated blocking oscillator. Thus, it is evident that the indication of a potential corresponding to a single impulse left on a particular capacitor represents a plurality of impulses originally applied to the beginning of the chain numerically equal to that factor by which the pulses have been "scaled down" or divided in the process of passing down the chain to the capacitor in question. The total count may, therefore, be determined with precision from a knowledge of the number of impulses stored on each capacitor and the factor associated therewith. The residual potentials on the capacitors are measured after the conclusion of the interval and indicated on a plurality of meters each indicating a convenient portion, such as a decimal place, of the total count.

A resetting impulse at least equal to the above-mentioned critical potential is generated in response to the commencement of each interval and applied to all capacitors to discharge them simultaneously to a reference potential corresponding to a zero reading of the counter in preparation for a new count. The indicating circuits, however, have a time constant such as to provide a continuous indication despite the intermittent flow of information from the counting chain.

Referring now to Fig. 1, there is shown an apparatus which responds to a first source 11 of periodic signals and a second source 12 of signals having substantially the same period. The apparatus serves to measure the recurrent interval between these signals and indicates the length thereof with a high degree of precision on a coarse scale meter 13, a medium scale meter 14 and a fine scale meter 15. The ratios of the full scale readings of the indicating devices 13, 14 and 15 are powers of ten; consequently the measured interval is indicated to at least three decimal places.

Sources 11 and 12 supply their pulses to an interval wave generator 16, wherein one series of pulses serves to initiate a substantially rectangular control wave, while the other series of pulses acts to terminate this wave. Devices having the properties of generator 16 are well known and may be derived from the Eccles-Jordan trigger circuit. The length of the wave provided by generator 16 is, therefore, precisely equal to the period which it is desired to measure.

A frequency standard 17 provides waves of some precise radio frequency, such as 100 kilocycles or 1 megacycle, to an electronic switch 18 normally blocking passage of these waves. In the particular embodiment of the invention illustrated in Fig. 1, the periodicity of the pulses which initiate the control wave bears a definite though not necessarily harmonic relationship to the frequency of the standard 17. The rectangular control wave is supplied from generator 16 to the switch 18 to permit passage of the standard frequency waves for precisely the duration of the interval to be measured. The intermittent output of the electronic switch 18 is fed to a blocking oscillator 19 of a conventional design. The blocking oscillator 19 is normally quiescent, but adapted to be synchronized at one-half the frequency of standard source 17 by the substantially sinusoidal triggering waves, every alternate one of which it converts into a sharp pulse or voltage spike which is passed on to a step counter 21.

The step counter 21, of a type discussed in detail with reference to Fig. 3, has a capacitor adapted to be charged in discrete voltage increments by each applied impulse. The potential on the charge collecting capacitor increases in steps until it exceeds that corresponding to a predetermined number of impulses. In the case of counter 21, this number is designated as five. This critical potential triggers a blocking oscillator which serves to discharge the capacitor and at the same time supply a voltage pulse to another step counter 22. Counter 22 is similar to counter 21, but acts to divide only by two, and feeds a series of impulses to a step counter 23. Counter 23 divides the pulses it receives by a factor of five and passes on the diminished number to a counter 24, which like device 22, reduces the received impulses by a half. A final counter 25 performs a division by five. It is evident that the series of counters may be extended to increase the number of pulses that may be counted either for lengthening the maximum period which may be unambiguously indicated or for providing more scales if the precision and frequency of the standard source 17 warrants them.

The counting and dividing action of counters 21 through 25 continues as long as the electronic switch 18 through the control of the interval defining control wave produced by generator 16 permits pulses to be supplied to the counting chain. Upon the termination of the unknown interval, a potential is left upon the charging capacitor associated with each step counter which is a measure of the electrical position of that counter at the time of the interval termination.

In the illustrated embodiment of the invention, it is desired to indicate the time interval on scales having maximum readings which are some power of ten units of time, e. g., microseconds. In order that the various scales may be decimally related, it is, of course, possible to adjust each step counter so that it divides by a factor of 10 and to employ separate indicating circuits responding to the potential on each capacitor whose charge increases in 10 steps before discharging through the associated blocking oscillator. However, this is not the most reliable arrangement since a relatively small change in operating conditions may cause such a counter to miscount, dividing instead by a factor of 9 or 11. It is, therefore, preferable for reasons of stability, to count to 10 in two operations as is illustrated. Under these conditions, a uniform decimal scale may be obtained by adding the voltages across the capacitors of adjacent two step and five step counters in suitable proportions, the potential corresponding to an impulse on the capacitor of a two step counter being adjusted to equal one-half the potential corresponding to a step on the capacitor of the next succeeding five step counter.

Leads 26 and 27 supply potentials corresponding to the voltages on the charge collecting capacitors of counters 24 and 25, respectively, to an electronic switch 28. Switch 28 is controlled by a wave provided by a metering wave generator 29, which is synchronized after a short delay created by delay circuit 31 by the termination of the wave issuing from generator 16. The switching wave created by generator 29 permits the sum of the potentials on leads 26 and 27 to be applied to a D. C. amplifier 32 only for a short time after the termination of the counting cycle. Limiting the time during which the voltages on the capacitors are sampled is a precaution against stray current leakages in these capacitors which may cause the voltages to drift upward or downward slightly before the recurrence of another timing cycle.

The amplifier 32 is adapted to have a long time constant so that the output voltage of the amplifier suffers substantially no change between successive periods of the same duration. The meter 13 is connected to the output of amplifier 32 and provides a continuous indication of the recurrent charge condition of the counters 24 and 25. The charge potentials on the capacitors associated with step counters 22 and 23 are impressed over leads 34 and 35, respectively, on an electronic switch 33 similar to switch 28. A D. C. amplifier 36 like device 32 amplifies the selectively applied potential and drives the meter 14.

It is evident that the coarse reading meter 13 and the medium scale meter 14 indicate only at discrete points jumping from one position to the next highest as the counters whose potential they reveal pass from one charge condition to the next possible higher charge condition. It is desirable that the fine scale meter 15 indicate smoothly throughout its range interpolating between discrete points on its scale. Thus, if the fine scale meter 15 may be read to an accuracy of one percent, then the three meters enable the count to be determined to four decimal places. This interpolation on fine scale 15 is accomplished through the employment of a sawtooth generator 37.

The saw tooth generator 37 produces a linear time sweep voltage which is initiated by output pulses supplied over a lead 50 from step counter 21. The interval wave generator 16 suspends or freezes the action of the saw tooth generator 37 at the instantaneous conclusion of the measured interval by application of the control wave over a lead 40. A potential corresponding to the position of the saw tooth wave as stopped in its linear charging cycle somewhere between the zero reference potential and full charge condition is applied over lead 38 to an electronic switch 39 and D. C. amplifier 41 similar to the devices previously discussed. The meter 15 is actuated by the amplifier 41 so that as the measured interval changes, this meter follows these changes from its zero position to its full scale position in a smooth manner.

If, for example, the interval is zero and increases constantly, then meters 13 and 14 lie steady at zero indication while meter 15 gradually attains its maximum indication. When the interval exceeds this fine scale maximum, meter 15 drops suddenly to zero while meter 14 jumps to its first index. The fine scale meter then progresses to its maximum again, at which point the medium scale meter jumps to its second position as the meter 15 drops again to zero. When the medium scale meter 14 attains its maximum indication, it falls to zero, while the coarse scale meter jumps to its first indicating position. It is evident that the three meters may be read from right to left to obtain a highly precise summation of the pulses of standard frequency which are contained within the measured interval.

At the commencement of each interval all the counters are set to zero by discharging their associated capacitors. This is accomplished by the provision of a resetting pulse generator 42 which is act .ated by the leading edge of the substantially rectangular control wave from generator 16 and is adapted to create a sharp pulse in response thereto. This pulse is applied over a lead 43 to all counters simultaneously. The action of the resetting pulse is discussed in more detail in Fig. 3, but it may be noted that since this zero setting of the counters occurs at the commencement of the measured interval, the deleterious effects of stray current leakage through the capacitor circuits are minimzed.

Fig. 2 illustrates an alternate input circuit arrangement 45' which may be substituted for that portion of Fig. 1 which is enclosed by dashed lines and designated by the reference numeral 45. The structure of Fig. 2 is adapted for the precise measurement of audio frequencies. A source of low frequency 46 is supplied to a square wave shaper 47 which corresponds to the interval wave generator 16 in Fig. 1. The square wave shaper 47 forms the wave supplied by source 46 into substantially rectangular pulses having lengths corresponding to one-half the period of the applied waves. The waves produced by wave shaper 47 are employed as control waves in a manner similar to Fig. 1. In lieu of frequency standard 17 and electronic switch 18, a stable shock-excited oscillator 48 is preferably provided. With this circuit, the control waves from device 47 excite the standard frequency oscillations rather than merely control their passage.

The advantage arising from the employment of the shock-excited oscillator 48 is that the leading edge of the control wave determines the phase of the generated waves as well as the moment when these waves are applied to the counting chain. If the initial phase is not maintained constant, the interval between the resetting pulse and the first pulse provided by the blocking oscillator 19 does not remain fixed. Under these conditions meter 15 indicates only at discrete points like meters 13 and 14 and the interpolating action of sawtooth generator 37 is rendered ineffectual. For this reason, the use of the electronic switch 18 in Fig. 1 is preferably restricted to those applications where the periodicity of the pulses initiating the control wave bears a definite though not necessarily harmonic relationship to the frequency of the standard source 17.

When the counter is employed with the input circuit 45' rather than 45 then the meters 13, 14 and 15 may be calibrated directly in frequency rather than merely indicating the time occupied by a half cycle of the low frequency wave from source 46.

The step counter 23 which is typical of counters 21 through 25 is shown in detail in Fig. 3. An input lead 51 is connected through a capacitor 52 to a cathode 53 and an anode 54 of two diodes contained within a common vacuum envelope 55. A cathode 56 associated with the anode 54 is attached to a charge collecting capacitor 57 whose other side is held at ground potential. The floating side of the capacitor 57 is also connected to a grid 58 of a triode whose anode 59 is coupled through a feed-back transformer 62 to its cathode 61 to form a blocking oscillator circuit. An anode 63 associated with the cathode 53 is attached to a cathode 64 of a triode 65 which has no plate load but merely a cathode resistor 66 suitably chosen to provide a cathode follower action. Triode 65 has a grid 67 connected through a grid resistor 68 to an adjustable voltage divider 69 placed between a source of negative potential and ground. The adjustable connection between resistors 68 and 69 permits the bias of tube 65 to be controlled so that the cathode 64 is maintained at some suitable negative reference potential. The lead 43 carrying the resetting pulses is connected through a blocking capacitor 71 to the grid 67. Another cathode folower circuit is provided to measure the potential across the charge collecting capacitor 57 without drawing current therefrom. This latter cathode follower comprises a triode 72 whose grid 73 is connected to the ungrounded side of capacitor 57, and whose cathode 74 is provided with a load resistor 75. The lead 34 supplying the indicating circuits is attached to the cathode 74.

In the operation of the step counter illustrated in Fig. 3, pulses shown in Fig. 4B as at 81, are applied to the input lead 51 for the duration of the time interval defined by a control wave 82 shown in Fig. 4A. The negative portions of the applied pulses are readily passed by the diode combination of cathode 53 and anode 63 and applied to the cathode load 66. Since the effective output impedance of a cathode follower corresponds to the combination of the cathode resistor in parallel with a fictitious resistor approximately equal to the reciprocal of the variational transconductance of the tube, the impedance between the cathode 64 and ground is low. The negative pulses are therefore substantially shorted to ground. The positive portions of input pulses 81 are barred from this circuit by the action of the diode, but are free to pass from anode 54 to cathode 56 and charge the capacitor 57 in steps. The initial bias on the blocking oscillator is equal to the negative potential of cathode 64 and is such as to keep the blocking oscillator quiescent. The potential on the capacitor 57 increases according to the wave 83 shown in Fig. 4E. Upon application of every fifth pulse, however, the voltage across capacitor 57 reaches a critical or triggering potential such as indicated by reference numeral 84.

At this voltage amplitude plate current commences to flow through the transformer 62. This action induces a negative voltage between the cathode 61 and ground, which causes a further rise in plate current flow. This action is regenerative and the grid 58 swings highly positive with respect to the cathode 61 and permits current flow which discharges the capacitor 57 to the negative reference potential. Any attempt on the part of the discharge to place capacitor 57 at a more negative potential with respect to ground is prevented by the low impedance offered by the series combination of the two diodes and the small output impedance of the cathode follower 65 which dissipates all charge more negative than the reference potential on cathode 64. The regenerative action of the blocking oscillator continues until the anode current reaches its saturation value. The voltage induced across transformer 62 then becomes zero. Stray and interwinding capacitors discharge quickly because they are small. The anode current then starts to decrease, thus creating a positive voltage in the cathode circuit, regeneration being now in the opposite direction. The potential difference between the grid 68 and cathode 61 is quickly carried below the cut-off point and the regeneration stops. The negative reference potential on the capacitor 57 holds the oscillator in a quiescent condition until triggered by the next charge accumulation.

A facsimile of the voltage excursion of the grid 58 is impressed across the cathode load 75. The lead 35 therefore supplies the indicating circuits with a wave corresponding to Fig. 4E. The lead 77 attached to the blocking oscillator anode 59 provides the next succeeding step counter with pulses as shown at 85 in Fig. 4D, occurring at each discharge of the blocking oscillator. The numerical ratio of pulses 85 to pulses 81 is determined, of course, by the number of pulses which capacitor 57 accepts before reaching the critical potential, in this instance after five steps.

The resetting pulse shown at 86 in Fig. 4C and aligned with the lead edge of the control wave 82 produces a momentary positive voltage across the load resistor 66 which causes a current flow through the two diodes in envelope 55, and charges the capacitor 57 to a potential equal or exceeding the critical value necessary to discharge the blocking oscillator. The effect of the resetting pulse 86 is therefore to discharge the capacitor 57 no matter what its charge condition.

The details of a circuit suitable for the electronic switch 33 and the amplifier 36 are shown in Fig. 5. Leads 34 and 35 attached to the cathode followers in step counters 22 and 23, respectively, are connected through decoupling resistors 91 and 92, respectively, to the control grid 93 of a triode 94. Triode 94 acts as a cathode follower stage and has a cathode load resistor 95 shunted by a large value capacitor 96. This load circuit is connected to a grid 97 of a second cathode follower 98 which, in turn, has a load resistor 99. The load 99 is attached to an adjustable voltage divider 101. The meter 14 is connected together with a resistor 102 in series with the voltage divider 101 and a second voltage divider 103 interposed between a negative potential source and ground.

The grid 93 of triode 94 is also connected to the anode 104 of a rectifier 105 formed by connecting the grid of a triode to its plate. The cathode 106 of the rectifier 105 is attached to the anode 107 of a triode amplifier 108 having a plate load resistor 109. The grid 111 of triode 108 has a grid resistor 112 which is coupled through a blocking capacitor 113 to the lead 30 upon which is impressed the metering wave from generator 29.

In the operation of the circuit shown in Fig. 5, the step voltages from the two step counter 22 and the five step counter 23 are mixed by the parallel feed of leads 34 and 35 through the resistors 91 and 92 which can be adjusted to provide a uniform ten-step wave form. Figs. 6B and 6C illustrate the wave shapes 115 and 120, respectively, impressed on leads 34 and 35, respectively, and Fig. 6D shows with dashed lines 116 the summation of these voltages in such proportion as to provide a uniform scale. The wave shape 116 does not, however, appear on the grid 93 because during the timing interval tube 108 is conducting, causing a voltage drop across the load resistor 109 such as to keep the anode 107 at substantially the negative reference potential although, of course, at a positive potential with respect to its cathode. Under these conditions, any potential applied by leads 34 or 35 to the grid 94 more positive than this negative reference potential is conducted through the rectifier 105 to ground.

After the conclusion of the interval 82 shown in Fig. 4A, the metering wave illustrated in Fig. 6A at 117 is applied with a negative polarity to to the grid 111 of the tube 108 thereby cutting off current flow through resistor 109 and rendering the rectifier 105 inoperative. The tube 94 is thus permitted to respond to the voltages supplied over leads 34 and 35. These voltages correspond to the residual charges on the capacitors in the step counters as mixed by resistors 91 and 92. The capacitor 96 assumes a voltage in accordance with this charge as indicated by the solid line 118 in Fig. 6D. The metering wave allows this voltage to be applied for a short period at the termination of which the connection between the step counters and the cathode follower 94 is removed and all further voltages on the grid 93 are shorted by the combined action of tubes 108 and 105.

As has been mentioned, this momentary sampling of the residual potentials shortly after the end of the measured interval is designed to render the indicating circuit substantially independent of leakage in and around the charge collecting capacitors. Therefore, the charge on the capacitor 96 is readjusted for a short interval having the same repetition rate as the measured interval. The time constant of the parallel combination of resistor 95 and capacitor 96 is very long and the potential on the grid 97 is substantially free from fluctuations. The cathode follower 98 drives the meter 14 without loading the capacitor 96. The calibration of meter 14 may be adjusted by the voltage divider 101, while the zero setting may be corrected by the voltage divider 103. The meter 14 may be placed at a point remote from the remainder of the apparatus without resorting to shielded cables, since the circuit impedance is relatively low.

A suitable circuit for the time sweep generator 37, is shown in detail in Fig. 7. A charge collecting capacitor 121 is connected between the cathode 122 of a diode 123 and ground. The diode 123 has an anode 124 which is attached to the junction of resistors 125 and 126. Another resistor 127 is joined to the end of resistor 126 opposite resistor 125, the three resistors 127, 126 and 125 forming a series circuit placed between positive and negative sources of potential. The point of attachment of anode 124 is arranged to be at substantially zero potential. The control lead 40 from generator 16 has a connection in common with resistors 126 and 127.

The ungrounded side of the capacitor 121 is also attached to an anode 128 of a pentode 129. The pentode 129 is maintained in a nonconductive condition by a negative bias placed on its control grid 131 and supplied from a negative source through a grid resistor 132 attached thereto. The lead 50 coming from the step counter 21 is connected through a coupling capacitor 133 to the pentode grid 131. The potential on the charge collecting capacitor 121 is measured without drawing current therefrom by means of a cathode follower stage 134 which has a cathode load 135 to whose high potential side the lead 38, supplying the switching, amplifying and indicating circuits 39, 41 and 15, respectively, is attached.

In the operation of the circuit shown in Fig. 7, the interval wave generator 16 supplies the control wave with a positive polarity over lead 40. This wave flows through the series resistors 127, 126 and 125 and causes the potential on the anode 124 of the diode 123 to be displaced in a positive direction. This allows diode 123 to conduct, drawing current through the high resistance of resistor 126 and gradually charging capacitor 121. The increase in potential across capacitor 121 is substantially linear with respect to time. This charging action continues for the duration of the measured interval. Meanwhile, however, pulses from the counter 21 are periodically impressed upon control grid 131 of pentode 129. Tube 129 is thereby made momentarily conductive and effectively shorts the capacitor 121 to ground. The potential across capacitor 121 therefore is very rapidly reduced to zero and immediately starts to recharge through the diode 123. It is evident that substantially saw-tooth waves are generated across capacitor 121 as long as the measured interval lasts. At the termination of the interval, however, the control wave from generator 16 stops charging the capacitor and no more discharging pulses are supplied from the counter 21. Under these conditions, the capacitor 121 is neither allowed to accumulate charge nor is it discharged, and therefore retains whatever intermediate charge it has acquired at the instant the interval ends. Although the cathode follower 134 impresses a replica of the potential across capacitor 121 over lead 38, it is only this last charge condition which the electronic switch 39 permits the fine scale meter 15 to indicate.

The present invention has been disclosed as embodied in an apparatus which is not limited in its speed of response by the inertia of mechanical elements, which is well adapted to provide remote indication, which affords highly accurate measurements while utilizing circuits comprising components having liberal electrical tolerances, and whose principle of operation finds application in such apparently different fields as low frequency measurement and high speed photoelectric counting or sorting.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. Apparatus for measuring a time interval by counting the number of waves of known frequency contained within said interval comprising a source of waves of said known frequency, a step counter having a capacitor adapted to be charged in discrete voltage increments by each cycle of said waves, means for placing a reference potential on said capacitor at the commencement of said interval, means for applying said waves to said counter during said interval, and means responsive to the difference between the potential present on said capacitor upon the conclusion of said interval and said reference potential to indicate the number of cycles applied to said counter.

2. In apparatus for counting a recurrent series of impulses, a capacitor, means for charging said capacitor in steps to successively higher potentials in response to successive impulses, means responsive to a critical potential for discharging said capacitor after a predetermined number of impulses, means responsive only between said recurrent series of impulses for measuring the residual potential on said capacitor to determine the number of impulses in excess of an integral multiple of said predetermined number of impulses, and means generating a resetting impulse at least equal to said critical potential for discharging said capacitor at the commencement of the next series of said impulses.

3. In apparatus for counting a recurrent series of impulses, a capacitor, means for charging said capacitor in steps to successively greater potentials in response to successive impulses, a blocking oscillator arranged to discharge said capacitor when the potential exceeds that corresponding to a predetermined number of impulses, metering means responsive only between said recurrent series of impulses for measuring the residual potential on said capacitor to determine the number of impulses in excess of an integral multiple of said predetermined number, and means producing a resetting impulse for discharging said capacitor at the commencement of the next series of said impulses.

4. In apparatus for counting a recurrent series of impulses, a capacitor, means for altering the potential on said capacitor from a reference potential in steps in response to said impulses, a blocking oscillator arranged to return said capacitor to said reference potential when the potential reaches a magnitude corresponding to a predetermined number of impulses, metering means responsive only between said series of impulses for measuring the residual potential on said capacitor to determine the number of impulses impressed thereon in excess of an integral multiple of said predetermined number, and means producing a resetting impulse for returning said capacitor to said reference potential at the commencement of the next series of said impulses.

5. In impulse counting apparatus wherein a series of capacitors are charged one from another in progression, each receiving an impulse upon the discharge of the preceding capacitor until a predetermined number of charging impulses have been received and then discharging to provide the succeeding capacitor with a charging impulse, the combination of cathode follower circuits each comprising a grid controlled electron tube having a cathode load, rectifying means connected between said capacitors and said cathode loads, said rectifying means and said cathode loads providing low impedance paths shunting said capacitors for impulses of undesired polarity, and means for applying a resetting impulse to the grids of said cathode followers to discharge all said capacitors simultaneously.

6. Apparatus for counting recurrent groups of impulses comprising a series of charge collecting capacitors adapted to be charged in steps by applied impulses, blocking oscillators interconnecting said capacitors, each of said oscillators being triggered by a critical potential on the preceding capacitor corresponding to a predetermined number of impulses for discharging said capacitor and for concurrently supplying a charging impulse to the succeeding capacitor, metering means responsive only between said groups of impulses for measuring the residual potentials on said capacitors to determine the number of impulses applied thereto in excess of integral multiples of said predetermined number of impulses, means generating a resetting impulse at least equal to said critical potentials, and means for applying said resetting impulse at the commencement of the next group of impulses to discharge all said capacitors simultaneously.

7. Apparatus for measuring a time interval by counting the number of waves of known frequency occurring during said interval comprising means for generating waves of said known frequency, means for forming a substantially rectangular wave having a duration equal to said interval, a capacitor, means responsive to the leading edge of said rectangular wave for placing said capacitor at a reference potential, means controlled from said wave forming means for applying said waves of known frequency to said capacitor only during said interval, means for altering the potential on said capacitor from said reference potential in steps in response to said applied waves, and means responsive to the difference between the potential present on said capacitor upon the conclusion of said interval and said reference potential to indicate the number of cycles applied to said counter.

8. In apparatus for measuring a time interval by counting the number of timing waves of known frequency generated during said interval, means for interpolating between adjacent periods of said timing waves comprising means for forming a control wave characterizing said interval, a charge collecting capacitor, means responsive to said control wave for gradually charging said capacitor throughout said interval, capacitor discharging means, means responsive to said control wave for applying said timing waves to said discharging means during said interval to discharge said capacitor periodically and abruptly, and means for measuring the charge potential on said capacitor after the conclusion of said interval to determine the duration of the same in excess of an integral number of said timing periods.

9. In apparatus for measuring a time interval by counting the number of timing waves of known frequency generated during said interval, means for determining the duration of said interval in excess of an integral number of periods of said timing waves comprising means for forming a substantially rectangular control wave having a duration equal to said interval, a charge collecting capacitor, means responsive to said control wave for continuously and gradually charging said capacitor only during said interval, capacitor discharging means, means responsive to said control wave for applying said timing waves to said discharging means only during said interval to discharge said capacitor periodically and abruptly, means for measuring the charge potential on said capacitor, and means providing a continuous indication of said charge potential present at the conclusion of said interval as a function of said excess duration.

10. In apparatus for measuring a time interval by counting the number of waves of known frequency generated during said interval, means for forming a control wave characterizing said interval, an oscillator for generating waves of a known frequency in response to said control wave, a step counter supplied waves from said oscillator, said step counter having a capacitor adapted to be charged in steps by each cycle of said waves, means responsive to the front edge of said control wave for placing a reference charge on said capacitor, means responsive to the rear edge of said control wave for momentarily sampling the charge on said capacitor, and means for indicating the momentarily sampled charge condition.

11. Apparatus for counting recurrent groups of impulses comprising a series of charge collecting capacitors adapted to be charged in steps by applied impulses, blocking oscillators interconnecting said capacitors, each of said oscillators being triggered by a critical potential on the preceding capacitor corresponding to a predetermined number of impulses for discharging said capacitor and for concurrently supplying a charging impulse to the succeeding capacitor, metering means responsive only between said groups of impulses for adding in fixed proportions the residual potentials on said capacitors to determine the number of impulses applied to said series in excess of an integral multiple of the product of the predetermined number of impulses necessary to discharge each capacitor of said series, means generating a resetting impulse at least equal to said critical potential, and means for applying said resetting impulse at the commencement of the next group of impulses to discharge all said capacitors simultaneously.

12. Apparatus for counting a group of impulses comprising a series of charge collecting capacitors adapted to be charged in potential steps by applied impulses, blocking oscillators interconnecting said capacitors, each of said oscillators being triggered by a critical potential on the preceding capacitor corresponding to a predetermined number of impulses for discharging said capacitor and for concurrently supplying a charging impulse to the succeeding capacitor, and measuring means responsive only after the application of said groups of impulses for adding in fixed proportions the residual potentials on said capacitors to determine the number of impulses applied to said series in excess of an integral multiple of the product of the predetermined number of impulses necessary to discharge each capacitor of said series.

13. In apparatus for counting a recurrent series of impulses, a capacitor, means for charging said capacitor in steps to successively higher potentials in response to successive impulses, means responsive to a critical potential for discharging said capacitor after a predetermined number of impulses, means responsive only between said recurrent series of impulses for measuring the residual potential on said capacitor to determine the number of impulses in excess of an integral multiple of said predetermined number of impulses, and means generating a resetting impulse at least equal to said critical potential for discharging said capacitor.

14. In apparatus for counting a recurrent series of impulses, a capacitor, means for altering the potential on said capacitor from a reference potential in steps in response to said impulses, means for returning said capacitor to said reference potential when the potential reaches a magnitude corresponding to a predetermined number of impulses, metering means responsive only between said series of impulses for measuring the residual potential on said capacitor to determine the number of impulses impressed thereon in excess of an integral multiple of said predetermined number, and means producing a resetting impulse for returning said capacitor to said reference potential in preparation for the next series of said impulses.

15. In impulse counting apparatus, a capacitor, means for altering the charge on said capacitor in steps in response to applied impulses, means for returning said capacitor to its original charge condition when the charge potential reaches a magnitude corresponding to a predetermined number of applied impulses, a cathode follower circuit comprising a grid controlled electron tube having a cathode load, rectifying means connected between said capacitor and said load, said rectifying means and said cathode load providing a low impedance path shunting said capacitor for impulses of undesired polarity, and means for applying a resetting impulse to the grid of said cathode follower to return said capacitor to its original charge condition irrespective of the number of applied impulses.

16. In apparatus for timing an interval the combination comprising a charge collecting capacitor, means for continuously and gradually charging said capacitor during said interval, means for periodically and abruptly discharging said capacitor during said interval, and means for measuring the charge potential present on said capacitor at the conclusion of said interval.

DAVID E. KENYON.